US012131023B2

United States Patent
Nakano et al.

(10) Patent No.: US 12,131,023 B2
(45) Date of Patent: Oct. 29, 2024

(54) COMPUTER SYSTEM, METHOD OF TRACKING LINEAGE OF DATA, AND NON-TRANSITORY COMPUTER-READABLE MEDIUM

(71) Applicant: Hitachi, Ltd., Tokyo (JP)

(72) Inventors: Kaori Nakano, Tokyo (JP); Shinichi Hayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 56 days.

(21) Appl. No.: 18/166,524

(22) Filed: Feb. 9, 2023

(65) Prior Publication Data

US 2023/0376200 A1 Nov. 23, 2023

(30) Foreign Application Priority Data

May 17, 2022 (JP) .................................. 2022-080658

(51) Int. Cl.
*G06F 3/06* (2006.01)
(52) U.S. Cl.
CPC ............ *G06F 3/0604* (2013.01); *G06F 3/065* (2013.01); *G06F 3/067* (2013.01)
(58) Field of Classification Search
CPC ........ G06F 3/0604; G06F 3/065; G06F 3/067; G06F 3/0644; G06F 3/0653; G06F 16/11; G06F 3/0605
See application file for complete search history.

(56) References Cited

U.S. PATENT DOCUMENTS

| | | | |
|---|---|---|---|
| 2009/0144568 A1* | 6/2009 | Fung | G06F 1/324 713/300 |
| 2013/0031385 A1* | 1/2013 | Seto | G06F 1/28 713/300 |
| 2013/0290249 A1* | 10/2013 | Merriman | G06F 16/278 707/610 |
| 2014/0149466 A1* | 5/2014 | Sato | G06F 11/3013 707/803 |
| 2014/0350993 A1* | 11/2014 | Kawada | G06Q 10/0639 705/7.25 |
| 2020/0401348 A1* | 12/2020 | Satoyama | G06F 11/1451 |
| 2022/0222207 A1* | 7/2022 | Kaneko | G06Q 30/018 |

(Continued)

FOREIGN PATENT DOCUMENTS

JP 2004-258733 A 9/2004
JP 2011-238165 A 11/2011

*Primary Examiner* — Tasnima Matin
(74) *Attorney, Agent, or Firm* — Volpe Koenig

(57) ABSTRACT

A computer system is coupled to a database management system for managing data, and an infrastructure system for managing storage areas of the data. The computer system is configured to: receive a tracking request including identification information of target data; calculate, based on information on the data managed by the database management system, a data duration period of the target; identify, based on configuration history information on a configuration of the storage areas, a first storage area which is provided to the database management system for the data duration period and which stores the target data; and execute, based on the data duration period and history of copying operation of the storage areas of the infrastructure system, with the first storage area as an originating point, tracking processing for tracking a second storage area in which the target data is stored by the copying operation.

12 Claims, 15 Drawing Sheets

(56) References Cited

U.S. PATENT DOCUMENTS

| | | | |
|---|---|---|---|
| 2023/0000351 A1* | 1/2023 | Ogasawara | G06Q 10/04 |
| 2023/0116149 A1* | 4/2023 | Radhakrishna | G06F 40/166 |
| | | | 717/110 |
| 2023/0335295 A1* | 10/2023 | Hirasawa | A61M 15/0085 |

* cited by examiner

| | 301 | 302 | 303 | 304 | 305 | 300 |
|---|---|---|---|---|---|---|
| | DATA UUID | DATA ID | DB ID | CREATION DATE/TIME | DELETION DATE/TIME | |
| | Table1_aaaa | Table1 | DB01 | 2021/01/01/ 00:30 | - | |
| | Table2_bbbb | Table2 | DB01 | 2021/01/01/ 00:31 | 2022/01/01/ 00:31 | |
| | Table3_cccc | Table3 | DB01 | 2021/01/01/ 00:31 | - | |
| | Table1_dddd | Table4 | DB02 | 2021/01/02/ 09:35 | - | |

FIG. 3

| | 401 | 402 | 403 | 404 | 405 | 400 |
|---|---|---|---|---|---|---|
| | VOLUME UUID | VOLUME ID | INFRASTRUCTURE ID | CREATION DATE/TIME | DELETION DATE/TIME | |
| | Volume1_aaaa | Volume1 | Sys01 | 2021/01/01/ 00:20 | - | |
| | Volume2_bbbb | Volume2 | Sys01 | 2021/01/01/ 00:25 | - | |
| | Volume3_cccc | Volume3 | Sys01 | 2021/01/02/ 00:30 | 2021/07/01/ 00:25 | |
| | Volume4_dddd | Volume4 | Sys02 | 2021/01/02/ 00:30 | 2021/08/01/ 00:25 | |

FIG. 4

| 501 | 502 | 503 | 504 | 505 | 506 |
|---|---|---|---|---|---|
| VOLUME UUID | DRIVE GROUP ID | DRIVE ID | INFRASTRUCTURE ID | CREATION DATE/TIME | DELETION DATE/TIME |
| Volume1_aaaa | DG1_aaaa | 0-0_aaaa;<br>0-1_aaaa;<br>0-2_aaaa;<br>0-3_aaaa; | Sys01 | 2021/01/01/ 00:30 | 2021/01/01/ 00:30 |

|   601    |   602    |   603    |   604    | 600 |
|----------|----------|----------|----------|-----|

| VOLUME UUID | EXTERNAL VOLUME UUID | START DATE/TIME | END DATE/TIME |
|---|---|---|---|
| Volume11_eeee | Volume20_abcd | 2021/05/07/ 11:35 | 2021/05/07/ 12:35 |

*FIG. 6*

| DB ID | VOLUME UUID | START DATE/TIME | END DATE/TIME |
|---|---|---|---|
| DB01 | Volume1_aaaa | 2021/01/01/ 00:30 | - |
| DB02 | Volume2_bbbb | 2021/01/02/ 10:30 | - |
| DB01 | Volume5_eeee | 2021/01/02/ 10:30 | 2021/09/01/ 00:22 |
| DB01 | Volume6_fffff | 2021/01/07/ 10:30 | - |

*FIG. 7*

| VOLUME UUID (Source) 801 | VOLUME UUID (Destination) 802 | OPERATION TYPE 803 | START DATE/TIME 804 | END DATE/TIME 805 |
|---|---|---|---|---|
| Volume1_aaaa | Volume3_cccc | ONE-TIME COPYING | 2021/01/07/ 11:30 | 2021/01/07/ 11:50 |
| Volume1_aaaa | Volume7_gggg | SNAPSHOT | 2021/01/02/ 00:00 | 2021/01/02/ 00:00 |
| Volume1_aaaa | Volume8_hhhh | ROUTINE COPYING | 2021/01/02/ 10:30 | — |

*FIG. 8*

| VOLUME UUID 901 | DRIVE GROUP ID (Source) 902 | DRIVE GROUP ID (Destination) 903 | START DATE/TIME 904 | END DATE/TIME 905 |
|---|---|---|---|---|
| Volume11_eeee | DG1_aaaa | DG2_bbbb | 2021/01/07/ 11:30 | 2021/01/07/ 11:50 |
| Volume11_eeee | DG3_cccc | DG4_dddd | 2021/01/02/ 00:00 | 2021/01/02/ 00:00 |

| OPERATION TYPE 1001 | STORAGE CONDITION 1002 | TRACKING CONDITION 1003 |
|---|---|---|
| ONE-TIME COPYING | END TIME OF COPYING PROCESSING < END TIME OF DURATION PERIOD [D]; START TIME OF DURATION PERIOD [D] < END TIME OF COPYING PROCESSING; | SAME AS "STORAGE CONDITION" |
| ROUTINE COPYING | START TIME OF COPYING PROCESSING < END TIME OF DURATION PERIOD [D]; END TIME OF COPYING PROCESSING < START TIME OF DURATION PERIOD [D]; | START TIME OF COPYING PROCESSING < END TIME OF DURATION PERIOD [D]; START TIME OF DURATION PERIOD [D] < END TIME OF COPYING PROCESSING; |
| SNAPSHOT | START TIME OF COPYING PROCESSING < END TIME OF DURATION PERIOD [D]; START TIME OF DURATION PERIOD [D] < END TIME OF COPYING PROCESSING; | SAME AS "STORAGE CONDITION" |

FIG. 10A

| 1011 OPERATION TYPE | 1012 STORAGE CONDITION | 1013 TRACKING CONDITION |
|---|---|---|
| ONE-TIME COPYING | END TIME OF COPYING PROCESSING < END TIME OF DURATION PERIOD [D]; START TIME OF DURATION PERIOD [D] < END TIME OF COPYING PROCESSING; END TIME OF COPYING PROCESSING < END TIME OF DURATION PERIOD [V] | SAME AS "STORAGE CONDITION" |
| ROUTINE COPYING | START TIME OF COPYING PROCESSING < END TIME OF DURATION PERIOD [D]; START TIME OF DURATION PERIOD [D] < END TIME OF COPYING PROCESSING; END TIME OF COPYING PROCESSING < END TIME OF DURATION PERIOD [V] | START TIME OF COPYING PROCESSING < END TIME OF DURATION PERIOD [D]; START TIME OF DURATION PERIOD [D] < END TIME OF COPYING PROCESSING < END TIME OF DURATION PERIOD [V]; START TIME OF DURATION PERIOD [D] < END TIME OF COPYING PROCESSING |
| SNAPSHOT | START TIME OF COPYING PROCESSING < END TIME OF DURATION PERIOD [D]; START TIME OF DURATION PERIOD [D] < END TIME OF COPYING PROCESSING; END TIME OF COPYING PROCESSING < END TIME OF DURATION PERIOD [V] | SAME AS "STORAGE CONDITION" |

| OPERATION TYPE | STORAGE CONDITION | TRACKING CONDITION |
|---|---|---|
| ONE-TIME COPYING | END TIME OF COPYING PROCESSING < END TIME OF DURATION PERIOD [V]; (START TIME OF DURATION PERIOD [V] < EXECUTION END TIME); | SAME AS "STORAGE CONDITION" |
| ROUTINE COPYING | END TIME OF COPYING PROCESSING < END TIME OF DURATION PERIOD [V]; (START TIME OF DURATION PERIOD [V] < END TIME OF COPYING PROCESSING); | SAME AS "STORAGE CONDITION" |
| SNAPSHOT | START TIME OF COPYING PROCESSING < END TIME OF DURATION PERIOD [V]; (START TIME OF DURATION PERIOD [V] < END TIME OF COPYING PROCESSING); | SAME AS "STORAGE CONDITION" |

| LAYER 1201 | VOLUME UUID (Destination) 1202 | VOLUME UUID (Source) 1203 | OPERATION TYPE 1204 | TRACKING FLAG 1205 | STORAGE FLAG 1206 |
|---|---|---|---|---|---|
| 1 | Volume1_aaaa | - | - | 1 | 1 |
| 2 | Volume3_cccc | Volume1_aaaa | ONE-TIME COPYING | 0 | 1 |

1200

COMPUTER SYSTEM, METHOD OF TRACKING LINEAGE OF DATA, AND NON-TRANSITORY COMPUTER-READABLE MEDIUM

CROSS-REFERENCE TO RELATED APPLICATIONS

The present application claims priority from Japanese patent application JP 2022-080658 filed, on May 17, 2022, the content of which is hereby incorporated by reference into this application.

BACKGROUND OF THE INVENTION

This invention relates to a technology for tracking lineage of data.

From the viewpoint of protection of personal information, enhancement of security measures, and the like, strict management of classified data is important. In management of classified data, a storage location of classified data is required to be kept track of. With regards to this, a technology as described in JP 2011-238165 A is known.

In JP 2011-238165 A, there is included a description "In a computer system including a metadata management server and a lineage management server which manages lineage, the servers are coupled to a client computer which holds the files, and the metadata management server is configured to: detect an event in which metadata of one of the files held by the client computer is changed; request the lineage management server to search for lineage related to the detected event; extract, based on a result of the search for the lineage transmitted from the lineage management server, a second file derived from a first file, which has the changed metadata, and a third file, from which the first file is derived; identify, out of the extracted second file and third file, the file whose metadata is to be changed; and generate a metadata update request for updating the metadata of the identified file."

SUMMARY OF THE INVENTION

With the technology as described in JP 2011-238165 A, a file and a derived file can be identified.

In a system configuration of recent years, a database management system for managing data and an infrastructure system for managing a storage area in which data is stored are separate entities. Accordingly, the infrastructure system executes copying, backing up, and the like of the storage area independently of the system that manages data. The infrastructure system manages history about a configuration of the storage area, but does not manage the data stored in the storage area.

It is accordingly difficult to keep track of all storage locations of data by simply combining operation history of the database management system and operation history of the infrastructure system.

This invention is to provide a technology for exhaustively tracking a data storage location in a system for managing data with use of a database management system and an infrastructure system.

A representative example of the present invention disclosed in this specification is as follows: a computer system comprises at least one computer including a processor, a storage device coupled to the processor, and a network interface coupled to the processor. The computer system is coupled to at least one database management system for managing data, and at least one infrastructure system for managing storage areas of the data. The computer system is configured to: receive a tracking request including identification information of target data; calculate, based on information on the data managed by the at least one database management system, a data duration period for which the target data is kept managed by the at least one database management system; identify, based on configuration history information on a configuration of the storage areas in the at least one infrastructure system, a first storage area which is provided to the at least one database management system for the data duration period and which stores the target data; execute, based on the data duration period and history of copying operation of the storage areas of the at least one infrastructure system, with the first storage area as an originating point, tracking processing for tracking a second storage area in which the target data is stored by the copying operation; and output information on the first storage area and the second storage area as the storage areas in which the target data is stored.

According to the at least one embodiment of this invention, a data storage location can exhaustively be tracked in the system for managing data with use of the database management system and the infrastructure system. Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein:

FIG. 3 is a table for showing an example of information included in database management system information in the first embodiment;

FIG. 4, FIG. 5, FIG. 6, FIG. 7, FIG. 8, and FIG. 9 are tables for showing an example of information included in infrastructure system information in the first embodiment;

FIG. 10A, FIG. 10B, and FIG. 10C are tables for showing an example of information included in tracking policy information in the first embodiment;

FIG. 12 is a table for showing an example of a tracking list generated by the data lineage management system of the first embodiment;

DETAILED DESCRIPTION OF THE PREFERRED EMBODIMENTS

Figure 1:
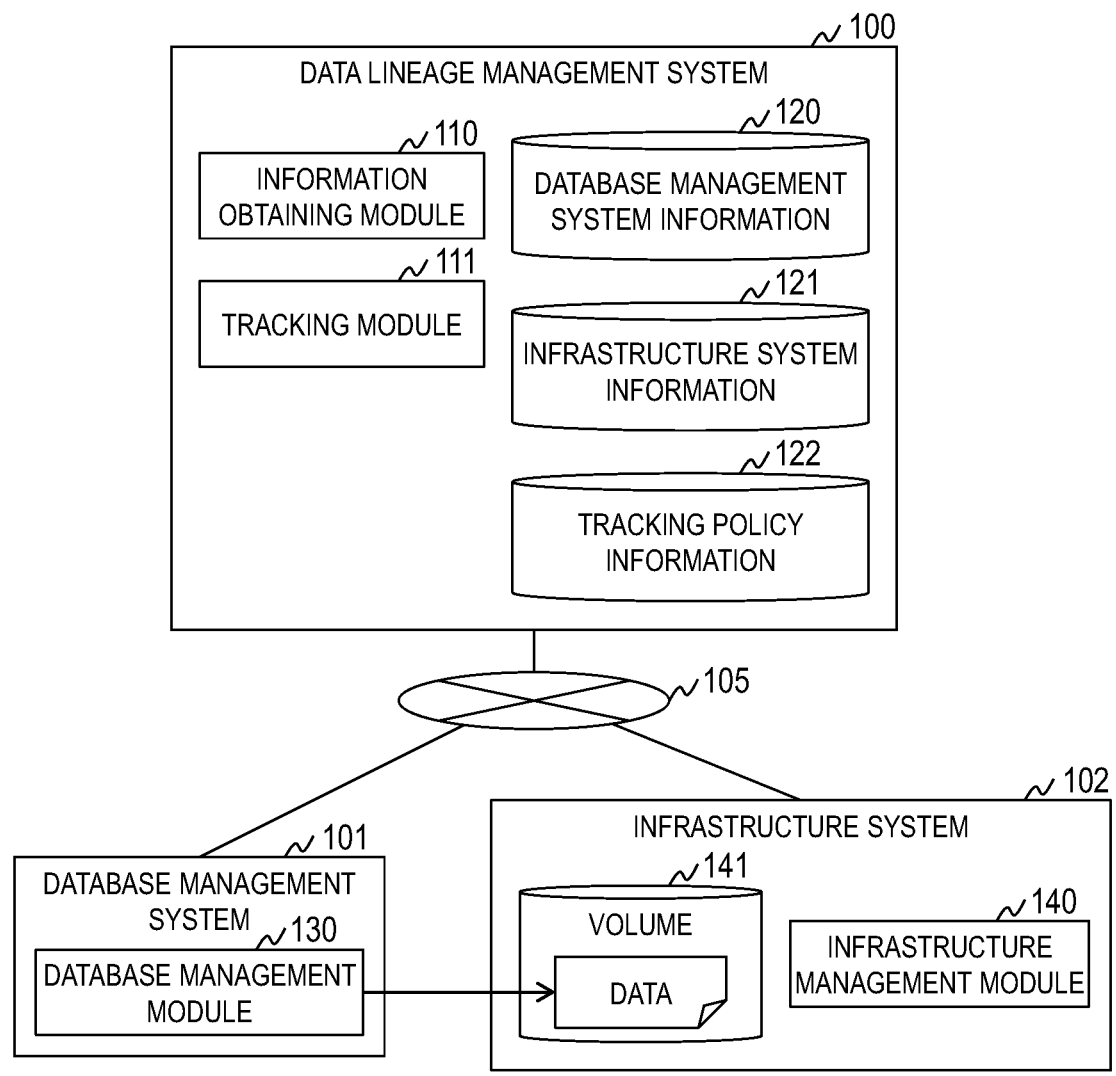
FIG. 1 is a diagram for illustrating an example of a configuration of a system according to a first embodiment of this invention.

Now, description is given of at least one embodiment of this invention referring to the drawings. It should be noted that this invention is not to be construed by limiting the invention to the content described in the following at least one embodiment. A person skilled in the art would easily recognize that specific configurations described in the following at least one embodiment may be changed within the scope of the concept and the gist of this invention.

In configurations of the at least one embodiment of this invention described below, the same or similar components or functions are denoted by the same reference numerals, and a redundant description thereof is omitted here.

Notations of, for example, "first", "second", and "third" herein are assigned to distinguish between components, and do not necessarily limit the number or order of those components.

The position, size, shape, range, and others of each component illustrated in, for example, the drawings may not represent the actual position, size, shape, range, and others in order to facilitate understanding of this invention. Thus, this invention is not limited to the position, size, shape, range, and others disclosed in, for example, the drawings.

First Embodiment

Figure 2:
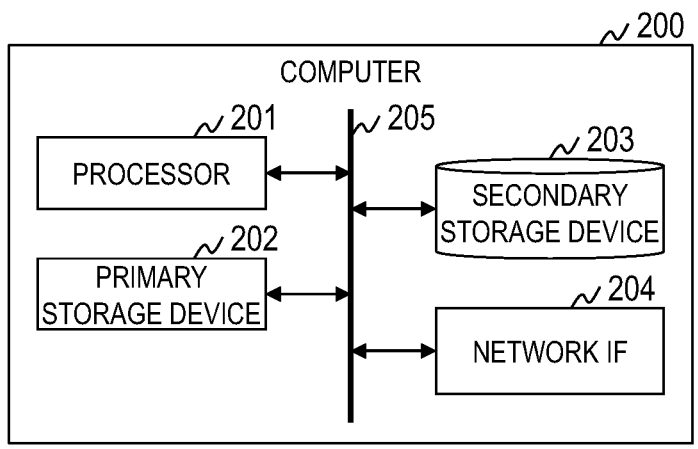
FIG. 2 is a diagram for illustrating an example of a configuration of a computer in the first embodiment.

FIG. 1 is a diagram for illustrating an example of a configuration of a system according to a first embodiment of this invention. FIG. 2 is a diagram for illustrating an example of a configuration of a computer in the first embodiment.

The system includes a data lineage management system 100, a database management system 101, and an infrastructure system 102. The systems are coupled to one another via a network 105, which is a local area network (LAN), a wide area network (WAN), or the like. The network 105 may be coupled by any of cable connection and wireless connection.

More than one database management system 101 may be included. More than one infrastructure system 102 may be included.

The database management system 101 is a system for managing a database in which user data is stored. The database management system 101 is configured from a computer including a processor, a primary storage device, and a network interface. The database management system 101 includes a database management module 130 for managing the database. The database management module 130 stores data in a storage area (volume 141) provided by the infrastructure system 102. The database management system 101 holds various types of control information. The control information is not directly relevant to this invention, and is accordingly omitted from the drawings.

This invention is not limited to a type and a size of data handled by the database management system 101. The data is, for example, block data, a table, a file, and the like. Tracking target data may be data that is a part of a table and data that is a part of a file as well.

The infrastructure system 102 is a system for providing at least one of the volume 141 to the database management system 101. The following are conceivable configurations of the infrastructure system 102. (Configuration 1) A system configured from a computer including a processor, a primary storage device, a secondary storage device (a drive), and a network interface. (Configuration 2) A system configured from a computer including a processor, a primary storage device, and a network interface, and from a drive box in which drives are installed. The infrastructure system 102 having Configuration 2 is a so-called storage system.

The infrastructure system 102 includes an infrastructure management module 140 for controlling generation, copying, and deletion of the volumes 141, allocation of the volumes 141 to the database management system 101, and the like. The infrastructure system 102 holds various types of control information. The control information is not directly relevant to this invention, and is accordingly omitted from the drawings.

The infrastructure management module 140 generates, from a plurality of drives, a drive group forming a redundant array of inexpensive disks (RAID), and generates the volumes 141 from the drive group.

The data lineage management system 100 is a system for managing lineage of data handled by the database management system 101. The data lineage management system 100 is configured from, for example, a computer 200 illustrated in FIG. 2.

The computer 200 includes a processor 201, a primary storage device 202, a secondary storage device 203, and a network interface 204. Those hardware components are coupled to one another via a bus 205. The computer 200 may include an input device such as a keyboard, a mouse, and a touch panel, and an output device such as a display.

The processor 201 executes a program stored in the primary storage device 202. The processor 201 in the first embodiment functions as an information obtaining module 110 and a tracking module 111 by executing processing in accordance with the program. With regards to function modules included in the infrastructure system 102, a plurality of function modules may be integrated into one function module, and one function module may be divided into a plurality of function modules that correspond to respective functions.

The primary storage device 202 is a memory or the like, and stores the program executed by the processor 201 as well as information used by the program. The primary storage device 202 in the first embodiment stores the program for implementing the information obtaining module 110 and the tracking module 111, and also stores database management system information 120, infrastructure system information 121, and tracking policy information 122.

The secondary storage device 203 is a hard disk drive (HDD), a solid-state drive (SSD), or the like, and permanently stores a large amount of data. The program and the information stored in the primary storage device 202 may be stored in the secondary storage device 203. In this case, the processor 201 reads the program and the information out of the secondary storage device 203, and loads the program and the information onto the primary storage device 202.

The network interface 204 holds communication to and from an external device via a network.

Next, details of the database management system information 120, the infrastructure system information 121, and the tracking policy information 122 are described.

The information obtaining module 110 obtains, from the database management system 101, information on data managed by the database management system 101, information on operation performed on the data, and the like, and stores the obtained information in the database management system information 120. The information obtaining module 110 obtains, from the infrastructure system 102, information on the volumes 141 managed by the infrastructure system 102, information on operation performed on the volumes 141, and the like, and stores the obtained information in the infrastructure system information 121.

The information obtaining module 110 may collect the information on data, the information on operation performed on the data, and the like directly from the database management system 101, or indirectly from another system. For example, the information may be collected from a system that manages a plurality of pieces of data and a plurality of databases together, such as a data catalog system. The information on data operation may be collected from an operation log, or may be information on operation deduced from a change in cyclically managed state and configuration of data. Similarly, the information on the volumes 141, the information on operation performed on the volumes 141, and the like may be collected indirectly from a place other than the infrastructure system 102. Information about operation deduced from a state and a configuration of the infrastructure may be collected.

The first embodiment is adaptable to any of an on-premises system, a public cloud, a hybrid cloud, and a multi-cloud.

FIG. 3 is a table for showing an example of the information included in the database management system information 120 in the first embodiment. FIG. 4, FIG. 5, FIG. 6, FIG. 7, FIG. 8, and FIG. 9 are tables for showing an example of the information included in the infrastructure system information 121 in the first embodiment. FIG. 10A, FIG. 10B, and FIG. 10C are tables for showing an example of information included in the tracking policy information 122 in the first embodiment.

The database management system information 120 is information for managing information on data handled by the database management system 101.

The database management system information 120 includes, for example, a table 300. The table 300 is information for managing data that has been handled by the database management system 101, and stores entries each including a data UUID 301, a data ID 302, a DB ID 303, a creation date/time 304, and a deletion date/time 305. There is one entry for each combination of a piece of data and a time at which the piece of data is handled. Fields included in each entry are not limited to the fields described above. Each entry may not include one of the fields described above, or may include other fields.

The data UUID 301 is a field in which identification information for uniquely identifying a piece of data that has been handled by the database management system 101 is stored. The data ID 302 is a field in which identification information used by the database management system 101 to identify the piece of data is stored. The DB ID 303 is a field in which identification information of the database management system 101 that has managed the piece of data is stored. The creation date/time 304 is a field in which a date/time of creation of the piece of data by the database management system 101 is stored. The deletion date/time 305 is a field in which a date/time of deletion of the piece of data by the database management system 101 is stored.

A piece of data corresponding to an entry in which the deletion date/time 305 is a blank field is data that has been and is being managed by the database management system 101.

Deletion of normal data and deletion (wipe) of data in a format difficult to recover may separately be managed. In this case, each entry may include a field in which a time of wipe is stored.

The infrastructure system information 121 is information for managing a configuration of the volumes 141, a log of control performed on the volumes 141, and the like. The infrastructure system information 121 includes, for example, tables 400, 500, 600, 700, 800, and 900.

The table 400 shown in FIG. 4 is information for managing each one of the volumes 141 that has been managed by the infrastructure system 102, and stores entries each including a volume UUID 401, a volume ID 402, an infrastructure ID 403, a creation date/time 404, and a deletion date/time 405. There is one entry for each combination of one of the volumes 141 and a time at which the one of the volumes 141 is managed. Fields included in each entry are not limited to the fields described above. Each entry may not include one of the fields described above, or may include other fields.

The volume UUID 401 is a field in which identification information for uniquely identifying one of the volumes 141 that has been managed by the infrastructure system 102 is stored. The volume ID 402 is a field in which identification information used by the infrastructure system 102 to identify one of the volumes 141 is stored. The infrastructure ID 403 is a field in which identification information for managing the one of the volumes 141 is stored. The creation date/time 404 is a field in which a date/time of creation of the one of the volumes 141 by the infrastructure system 102 is stored. The deletion date/time 405 is a field in which a date/time of deletion of the one of the volumes 141 by the infrastructure system 102 is stored.

One of the volumes 141 that corresponds to an entry in which the deletion date/time 405 is a blank field is a volume that has been and is being managed by the infrastructure system 102.

Deletion of the volumes 141 that are normal and deletion (wipe) of data in a format difficult to recover may separately be managed. In this case, each entry may include a field in which a time of wipe is stored.

The table 500 shown in FIG. 5 is information for managing an association relation between one of the volumes 141 and a drive group from which a storage area forming the one of the volumes 141 is provided, and stores entries each including a volume UUID 501, a drive group ID 502, a drive ID 503, an infrastructure ID 504, a creation date/time 505, and a deletion date/time 506. There is one entry for each one of the volumes 141. Fields included in each entry are not limited to the fields described above. Each entry may not include one of the fields described above, or may include other fields.

The volume UUID 501 is the same field as the volume UUID 401. The drive group ID 502 is a field in which identification information of a drive group that provides a storage area forming the one of the volumes 141 is stored. The drive ID 503 is a field in which pieces of identification information of drives included in the drive group are stored. In the drive ID 503, pieces of identification information of all drives included in the drive group are stored in a list format. The infrastructure ID 504 is a field in which identification information of the infrastructure system 102 that manages the drive group is stored. The creation date/time 505 is a field in which a date/time of creation of the drive group by the infrastructure system 102 is stored. The deletion date/time 506 is a field in which a date/time of deletion of the drive group by the infrastructure system 102 is stored.

The table 600 shown in FIG. 6 is information for managing virtual volumes, and stores entries each including a volume UUID 601, an external volume UUID 602, a start date/time 603, and an end date/time 604. There is one entry for each virtual volume. Fields included in each entry are not limited to the fields described above. Each entry may not include one of the fields described above, or may include other fields.

Virtual volumes are volumes provided by one infrastructure system 102 as the volumes 141 managed by itself that are the volumes 141 managed by another infrastructure system 102. In a case where IO to and from a virtual volume is received, transmission and reception of data are executed between the one infrastructure system 102 and the another infrastructure system 102.

The volume UUID 601 and the external volume UUID 602 are the same fields as the volume UUID 401. However, a volume UUID of a virtual volume is stored in the volume UUID 601, and a UUID of one of the volumes 141 that is a physical volume of the virtual volume is stored in the external volume UUID 602. The start date/time 603 is a field in which a date/time of start of provision of the virtual volume is stored. The end date/time 604 is a field in which a date/time of end of provision of the virtual volume is stored.

The table 700 shown in FIG. 7 is information for managing allocation of the volumes 141 to the database management system 101, and stores entries each including a DB ID 701, a volume UUID 702, a start date/time 703, and an end date/time 704. There is one entry for each combination of the database management system 101 and one of the volumes 141. Fields included in each entry are not limited to the fields described above. Each entry may not include one of the fields described above, or may include other fields.

The DB ID 701 is the same field as the DB ID 303. The volume UUID 702 is the same field as the volume UUID 401. The start date/time 703 is a field in which a date/time of start of provision of the one of the volumes 141 to the database management system 101 is stored. The end date/time 704 is a field in which a date/time of end of provision of the one of the volumes 141 to the database management system 101 is stored.

The table 800 shown in FIG. 8 is information for managing a log of copying operation of the volumes 141 in the infrastructure system 102, and stores entries each including a volume UUID (Source) 801, a volume UUID (Destination) 802, an operation type 803, a start date/time 804, and an end date/time 805. There is one entry for one execution of copying operation. Fields included in each entry are not limited to the fields described above. Each entry may not include one of the fields described above, or may include other fields.

The volume UUID (Source) 801 and the volume UUID (Destination) 802 are the same fields as the volume UUID 401. However, a volume UUID of one of the volumes 141 from which data is copied is stored in the volume UUID (Source) 801, and a volume UUID of one of the volumes 141 to which the data is copied is stored in the volume UUID (Destination) 802. The operation type 803 is a field in which a type of copying operation is stored. One of operation types out of "one-time copying" which refers to copying of data at any time point, "snapshot" which refers to copying of a state of the one of the volumes 141 at any time point, and "routine copying" which refers to synchronization copying such as mirroring and replication is stored in the operation type 803. The operation types described above are an example, and the operation type 803 is not limited thereto. The start date/time 804 is a field in which a date/time of start of copying processing between the volumes 141 is stored. The end date/time 805 is a date/time of end of the copying processing between the volumes 141 is stored.

The table 900 shown in FIG. 9 is information for managing a log of migration operation of the volumes 141 in the infrastructure system 102, and stores entries each including a volume UUID 901, a drive group ID (Source) 902, a drive group ID (Destination) 903, a start date/time 904, and an end date/time 905. There is one entry for one execution of migration operation. Fields included in each entry are not limited to the fields described above. Each entry may not include one of the fields described above, or may include other fields.

The volume UUID 901 is the same field as the volume UUID 401. The drive group ID (Source) 902 and the drive group ID (Destination) 903 are the same fields as the drive group ID 502. However, identification information of a migration source drive group is stored in the drive group ID (Source) 902, and identification information of a migration destination drive group is stored in the drive group ID (Destination) 903. The start date/time 904 is a field in which a date/time of start of migration of the one of the volumes 141 is stored. The end date/time 905 is a field in which a date/time of end of migration of the one of the volumes 141 is stored.

As described above, the tables 400, 500, 600, and 700 are history information on the configuration of the volumes 141 in the infrastructure system 102, and the tables 800 and 900 are history information on various types of operation performed on the volumes 141 of the infrastructure system 102.

The tracking policy information 122 is information for managing policies in tracking the volumes 141 and drives that are storage locations of data. The tracking policy information 122 includes, for example, tables 1000, 1010, and 1020.

The table 1000 shown in FIG. 10A is information for managing policies in searching for a second-layer volume 141, which is one of the volumes 141 having a copying relationship with a first-layer volume 141 and storing tracking target data that is stored in the first-layer volume 141, the first-layer volume 141 being another of the volumes 141 that is provided to the infrastructure system 102. The table 1000 stores entries each including an operation type 1001, a storage condition 1002, and a tracking condition 1003. There is one entry for one type of copying operation. Fields included in each entry are not limited to the fields described above. Each entry may not include one of the fields described above, or may include other fields.

The operation type 1001 is a field in which a type of copying operation is stored. The storage condition 1002 is a field for storing a condition for determining whether one of the volumes 141 has a copying relationship with another of the volumes 141 that is an originating point, and whether tracking target data is stored in the one of the volumes 141. The tracking condition 1003 is a field for storing a condition for determining whether one of the volumes 141 has a copying relationship with the another of the volumes 141 that is the originating point, and whether the one of the volumes 141 is a tracking target volume.

The table 1010 shown in FIG. 10B and the table 1020 shown in FIG. 10C are information for managing policies in searching for one of the volumes 141 that has a copying relationship with a second-layer or higher-layer volume out of the volumes 141, and that stores tracking target data.

The tables 1010 and 1020 are switched depending on the types of copying operation of the respective layers. The table 1010 is used in a case where the volumes 141 of the respective layers that are related to one of the volumes 141 that is a determination target all have routine copying as the type of copying operation. The table 1020 is used in a case where, out of the volumes 141 related to one of the volumes 141 that is a determination target, the volumes 141 of at least one layer do not have routine copying as the type of copying operation.

An operation type 1011 and an operation type 1021 are the same fields as the operation type 1001. A storage condition 1012 and a storage condition 1022 are the same fields as the storage condition 1002. A tracking condition 1013 and a tracking condition 1023 are the same fields as the tracking condition 1003.

Conditions set to the storage conditions 1002, 1012, and 1022 and tracking conditions 1003, 1013, and 1023 are defined based on a data duration period, provision periods of the volumes 141, and an execution period of copying processing. The data duration period is a period calculated from the creation date/time 304 and the deletion date/time 305. The duration periods of the volumes 141 is a period calculated from the creation date/time 404 and the deletion date/time 405. The execution period of copying processing is a period calculated from the start date/time 804 and the end date/time 805.

Volumes in which data is stored can exhaustively be tracked based on conditions using the data duration period, the provision periods of the volumes 141, and the execution period of copying processing. In addition, exhaustive tracking of volumes suited to characteristics of the type of copying operation is accomplished when conditions to be used are switched by taking a tree of copying operation into consideration.

Figure 11:
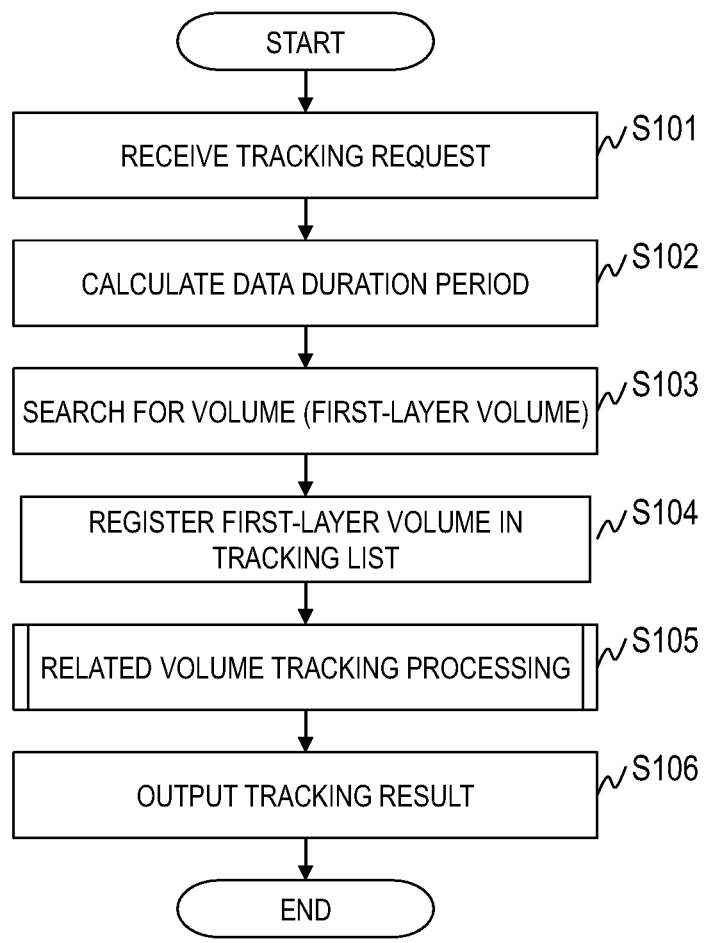
FIG. 11 is a flow chart for illustrating an example of a data tracking processing executed by a data lineage management system of the first embodiment.

This concludes the description of the information held by the data lineage management system 100. Next, data tracking processing executed by the data lineage management system 100 is described. FIG. 11 is a flow chart for illustrating an example of the data tracking processing executed by the data lineage management system 100 of the first embodiment. FIG. 12 is a table for showing an example of a tracking list generated by the data lineage management system 100 of the first embodiment.

The tracking module 111 receives, from a user, a tracking request including identification information (a data UUID) of tracking target data (target data) (Step S101). The tracking module 111 may display the data UUID of traceable data by referring to the table 300.

The tracking module 111 calculates the duration period of the target data, based on the database management system information 120 (Step S102).

Specifically, the tracking module 111 refers to the table 300 to search for an entry in which the data UUID of the target data is stored in the data UUID 301. The tracking module 111 calculates the data duration period based on the creation date/time 304 and the deletion date/time 305 of the entry found through the search. In a case where the deletion date/time 305 is a blank field, the tracking module 111 calculates the data duration period based on the creation date/time 304 and the current date/time.

The tracking module 111 searches, based on the data duration period and the infrastructure system information 121, for one of the volumes 141 that has been provided to the database management system 101 and that has stored the target data (the first-layer volume 141) (Step S103).

Specifically, the tracking module 111 refers to the table 700 to search for an entry in which a value of the DB ID 303 of the entry identified in Step S102 is set to the DB ID 701. The tracking module 111 calculates a determination period from the creation date/time 404 and the deletion date/time 405 of the entry found through the search. In a case where the determination period encompasses the data duration period, the tracking module 111 identifies each one of the volumes 141 of corresponding entries as the first-layer volume 141.

The tracking module 111 registers the first-layer volume 141 in a tracking list 1200 (Step S104).

In the tracking list 1200, entries each including a layer 1201, a volume UUID (Destination) 1202, a volume UUID (Source) 1203, an operation type 1204, a tracking flag 1205, and a storage flag 1206 are searched. There is one entry for one target volume 141. Fields included in each entry are not limited to the fields described above. Each entry may not include one of the fields described above, or may include other fields.

The layer 1201 is a field for storing a layer of a copying relationship which has the first-layer volume 141 as an originating point. Here, the layer of the first-layer volume 141 is 1. The volume UUID (Destination) 1202 and the volume UUID (Source) 1203 are the same fields as the volume UUID 401. However, the UUID of one of the volumes 141 that has been found through the search is stored in the volume UUID (Destination) 1202, and the UUID of another of the volumes 141 from which data is copied to the one of the volumes 141 that has been found through the search is stored in the volume UUID (Source) 1203. The operation type 1204 is a field in which the type of copying operation executed between the two volumes 141 is stored.

The tracking flag 1205 is a field in which a flag for determining whether to perform search with one of the volumes 141 that corresponds to the volume UUID (Destination) 1202 as the originating point is stored. In a case where search is to be executed with the one of the volumes 141 as the originating point, "1" is set to the tracking flag 1205. In a case where search is not executed with the one of the volumes 141 as the originating point, "0" is set to the tracking flag 1205.

The storage flag 1206 is a field in which a flag indicating whether target data is stored in one of the volumes 141 that corresponds to the volume UUID (Destination) 1202 is stored. In a case where target data is stored in the one of the volumes 141, "1" is set to the storage flag 1206. In a case where target data is not stored in the one of the volumes 141, "0" is set to the storage flag 1206.

In Step S104, the tracking module 111 adds an entry to the tracking list 1200, sets "1" to the layer 1201, and sets the volume UUID of the first-layer volume 141 to the volume UUID (Destination) 1202. The tracking module 111 also sets "1" to the tracking flag 1205 and sets "1" to the storage flag 1206. The volume UUID (Source) 1203 and the operation type 1204 are left as blank fields.

The tracking module 111 executes related volume tracking processing for tracking one of the volumes 141 (a related volume 141) that has a copying relationship with the first-layer volume 141 and that stores the target data (Step S105). The related volume tracking processing is described later.

The tracking module 111 outputs a tracking result including the first-layer volume 141 and the related volume 141 (Step S106), and ends the data tracking processing.

Figure 13A:
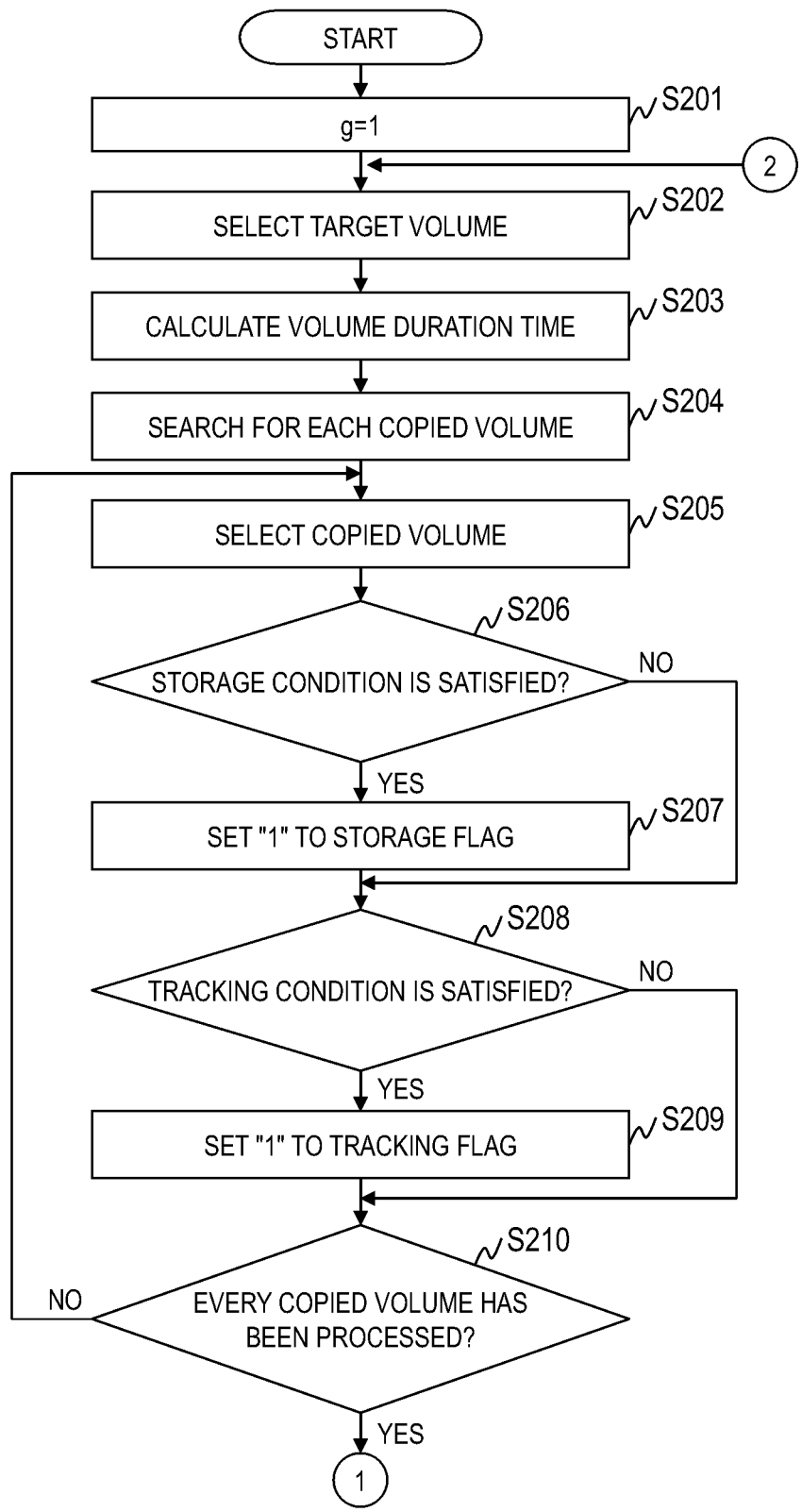
FIG. 13A and FIG. 13B are flow charts for illustrating an example of a related volume tracking processing executed by the data lineage management system of the first embodiment.
Figure 13B:
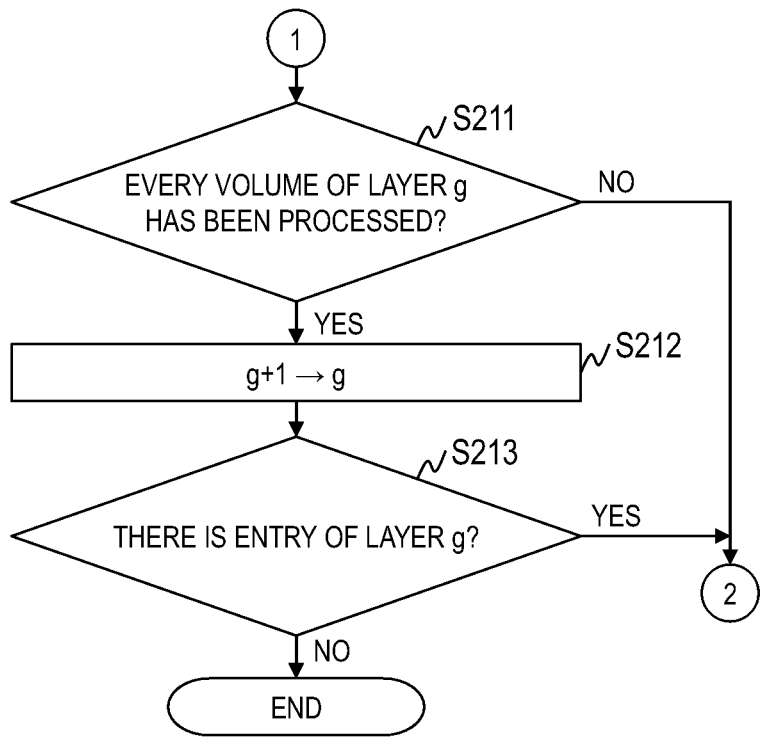

FIG. 13A and FIG. 13B are flow charts for illustrating an example of the related volume tracking processing executed by the data lineage management system 100 of the first embodiment.

The tracking module 111 sets an initial value "1" to a variable g, which indicates the layer (Step S201).

The tracking module 111 selects one entry (the target volume 141) from entries of the tracking list 1200 in which the value of the layer 1201 matches a value of the variable g and "1" is set to the tracking flag 1205 (Step S202). One of the volumes 141 that corresponds to the volume UUID (Destination) 1202 of the selected entry is the target volume 141.

The tracking module 111 calculates the volume duration period of the target volume 141 (Step S203).

Specifically, the tracking module 111 refers to the table 400 to search for an entry in which the volume UUID of the target volume is stored in the volume UUID 401. The tracking module 111 calculates the duration period of the target volume 141 based on the creation date/time 404 and the deletion date/time 405 of the entry found through the search. In a case where the deletion date/time 405 is a blank field, the tracking module 111 calculates the duration period of the volume based on the creation date/time 404 and the current date/time.

The tracking module 111 searches, based on the infrastructure system information 121, for each copied volume 141 copied from the target volume 141 (Step S204).

Specifically, the tracking module 111 refers to the table 800 to search for an entry in which the value of the volume UUID (Destination) 1202 of the target volume 141 is set to the volume UUID (Source) 801. In a case where there is no copied volume 141, the tracking module 111 advances the process to Step S211.

The tracking module 111 also adds an entry to the tracking list 1200, and sets a value obtained by adding 1 to the variable g to the layer 1201 thereof. In the added entry, the tracking module 111 sets the volume UUID of the copied volume 141 to the volume UUID (Destination) 1202, and sets the volume UUID of the target volume 141 to the volume UUID (Source) 1203. The tracking module 111 also sets the value of the operation type 803 of the found entry to the operation type 1204. The tracking module 111 sets "0" to the tracking flag 1205 and the storage flag 1206 of the added entry as well.

The tracking module 111 selects one copied volume 141 out of every copied volume 141 found through the search (Step S205).

The tracking module 111 determines whether the selected copied volume 141 satisfies a storage condition (Step S206). Specifically, the following processing is executed.

(Step S206-1) The tracking module 111 calculates the execution period of the copying processing based on the start date/time 804 and the end date/time 805 of the entry found through the search in Step S204.

(Step S206-2) The tracking module 111 obtains a storage condition to be used from the tracking policy information 122.

In a case where the variable g is "1," the tracking module 111 refers to the table 1000 to search for an entry in which the value of the operation type 803 of the found entry is set to the operation type 1001.

In a case where the variable g is other than "1," the tracking module 111 searches entries of the tracking list 1200 to track each copying relationship of the target volume 141. In a case where the operation type is "routine copying" in every entry found through the search, the tracking module 111 refers to the table 1010 to search for an entry in which the value of the operation type 803 of the found entries is set to the operation type 1011. In a case where the operation type is other than "routine copying" in at least one entry found through the search, the tracking module 111 refers to the table 1020 to search for an entry in which the value of the operation type 803 of the at least one found entry is set to the operation type 1021.

(Step S206-3) The tracking module 111 determines whether the obtained storage condition is satisfied based on the data duration period, the duration period of the target volume 141, and the execution period of the copying processing.

This concludes the description of the processing of Step S206.

In a case where the selected copied volume 141 does not satisfy the storage condition, the tracking module 111 advances the process to Step S208.

In a case where the selected copied volume 141 satisfies the storage condition, the tracking module 111 sets "1" to the storage flag 1206 (Step S207), and then advances the process to Step S208.

The tracking module 111 determines whether the selected copied volume 141 satisfies a tracking condition (Step S208).

Specifically, the tracking module 111 searches the policy information 122 for entries by the same procedure as in Step S206-2 to obtain a tracking condition. The tracking module 111 determines whether the tracking condition is satisfied based on the data duration period, the duration period of the target volume 141, and the execution period of the copying processing.

In a case where the selected copied volume 141 does not satisfy the tracking condition, the tracking module 111 advances the process to Step S210.

In a case where the selected copied volume 141 satisfies the tracking condition, the tracking module 111 sets "1" to the tracking flag 1205 (Step S209), and then advances the process to Step S210.

In Step S210, the tracking module 111 determines whether every copied volume 141 found through the search in Step S204 has been processed.

In a case where it is determined that not every found copied volume 141 has been processed, the tracking module 111 returns the process to Step S205 to execute the same processing.

In a case where it is determined that every found copied volume 141 has been processed, the tracking module 111 determines whether all volumes 141 of the layer g have been processed (Step S211).

In a case where it is determined that not all volumes 141 of the layer g have been processed, the tracking module 111 returns the process to Step S202 to execute the same processing.

In a case where it is determined that all volumes 141 of the layer g have been processed, the tracking module 111 sets a value obtained by adding 1 to the variable g as a new variable g (Step S212).

The tracking module 111 determines whether there is an entry of the layer g in the tracking list 1200 (Step S213). Specifically, whether there is an entry in which the value of the variable g is set to the layer 1201 is determined.

In a case where there is an entry of the layer g in the tracking list 1200, the tracking module 111 returns the process to Step S202 to execute the same processing.

In a case where there is no entry of the layer g in the tracking list 1200, the tracking module 111 ends the related volume tracking processing.

Figure 14:
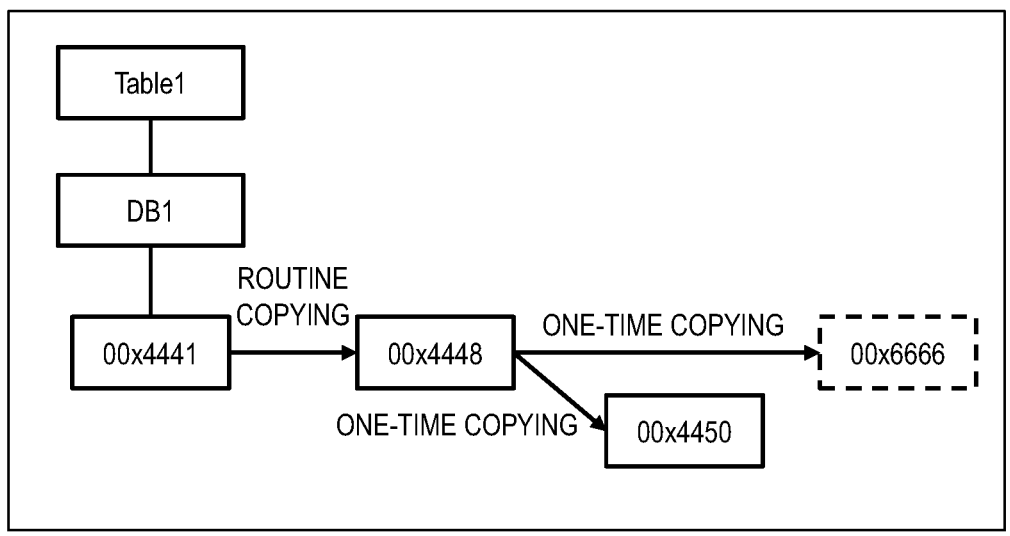
FIG. 14 is a diagram for illustrating an example of a tracking result output by the data lineage management system of the first embodiment.

FIG. 14 is a diagram for illustrating an example of a tracking result output by the data lineage management system 100 of the first embodiment.

The data lineage management system 100 is capable of displaying a tracking result as the one illustrated in FIG. 14, based on the tracking list 1200, the database management system information 120, and the infrastructure system information 121. In the tracking result, the volumes 141 that have "1" as the value of the storage flag 1206 are displayed. A dotted-line box represents a deleted object. The data lineage management system 100 may execute display or may output display information to another device or system.

According to the first embodiment, in the system for managing data with the use of the database management system 101 and the infrastructure system 102, the data lineage management system 100 enables exhaustive tracking of the volumes 141 that store data.

The data lineage management system 100 may be designed so as to receive such operation as deletion, wipe, and migration of data when the tracking result is displayed.

The data lineage management system 100 may hold information on data placement policies and placement information of the infrastructure system 102 that provides the volumes 141 to determine, based on the tracking result and the placement policies, whether a policy is contravened with respect to the volumes 141 that store data. Examples of a conceivable case include a case of determining whether the infrastructure system 102 that provides the volumes 141 is located in a specific country, and a case of determining whether the infrastructure system 102 that provides the volumes 141 is placed in a public cloud. In a case where a policy is contravened, the data lineage management system 100 may executes such operation as deleting, wiping, and migrating data. Appropriate storage and management of data is thus accomplished.

History of the like about operation performed on data may include a flag or the like that indicates whether the data is a tracking target. In this case, setting of a tracking condition in the tracking policy information 122 may be omitted.

In a case where the data is a file, history of operation performed on metadata of the file may be managed. For example, tracking is executable with a date/time of attachment of information indicating that the data is classified data to the metadata as an originating point.

In a case where the infrastructure system 102 is object storage, a packet in which data is stored may be tracked.

Second Embodiment

In a second embodiment of this invention, the duration periods of the volumes 141 are handled differently from the first embodiment. The following description about the second embodiment is centered on differences from the first embodiment.

The system according to the second embodiment has the same configuration as in the first embodiment. The data lineage management system 100, the database management system 101, and the infrastructure system 102 of the second embodiment have the same function configurations as in the first embodiment. Out of information held by the data lineage management system 100 of the second embodiment, the table 300 differs and pieces of information other than the table 300 have the same data structures as in the first embodiment.

Entries included in the table 300 in the second embodiment each include a wipe date/time. In the second embodiment, data is assumed to remain until wiped, and is tracked up to that point. Data wipe may be executed one piece of data at a time by the database management system 101 or other components, or may be executed on a volume-by-volume basis by the infrastructure system 102. In a case in which wipe is executed on a volume-by-volume basis, the wipe date/time is recorded for every piece of data (including deleted data) stored in the volumes 141.

Processing executed by the data lineage management system 100 of the second embodiment follows the same flow as in the first embodiment. In the second embodiment, however, the data duration period is calculated based on the creation date/time 304 and the wipe date/time in Step S102.

According to the second embodiment, the volumes 141 that store data in a recoverable state can be tracked as well.

Third Embodiment

The data lineage management system 100 in a third embodiment of this invention tracks drives that provide storage areas to volumes as well. The following description of the third embodiment is centered on differences from the first embodiment.

The system according to the third embodiment has the same configuration as in the first embodiment. The data lineage management system 100, the database management system 101, and the infrastructure system 102 of the third embodiment have the same function configurations as in the first embodiment. The information held by the data lineage management system 100 of the third embodiment is the same as in the first embodiment.

Figures 15, 16:
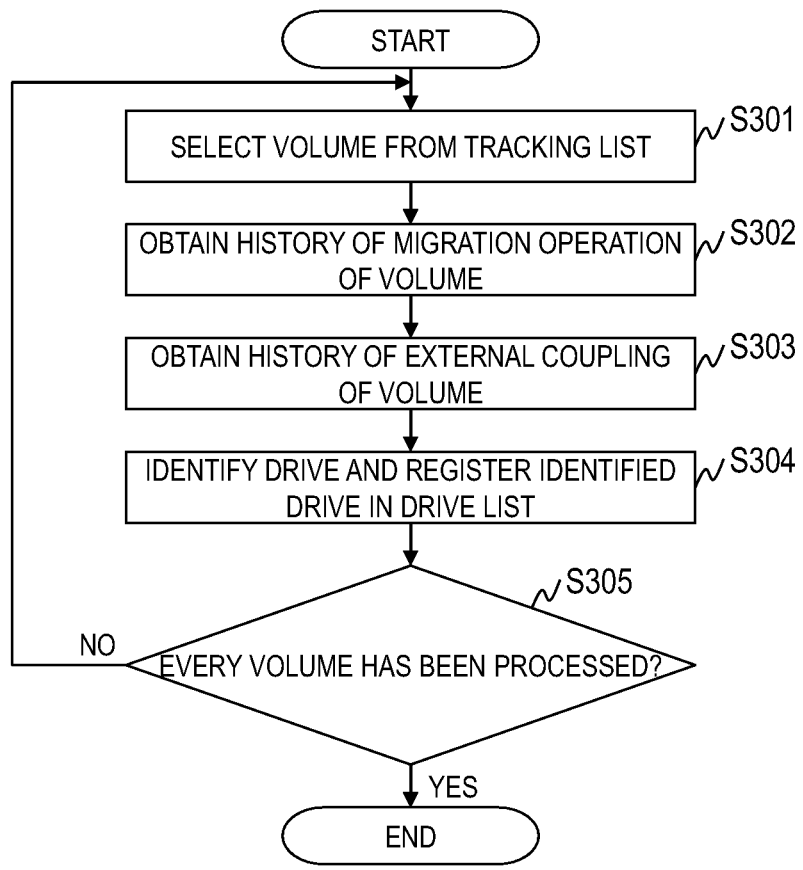
FIG. 15 is a flow chart for illustrating an example of the drive tracking processing executed by the data lineage management system of the third embodiment.
FIG. 16 is a table for showing an example of a drive group list generated by the data lineage management system of the third embodiment.

In data tracking processing in the third embodiment, drive tracking processing is executed after the processing of Step S105. FIG. 15 is a flow chart for illustrating an example of the drive tracking processing executed by the data lineage management system 100 of the third embodiment. FIG. 16 is a table for showing an example of a drive group list generated by the data lineage management system 100 of the third embodiment.

The tracking module 111 selects one of the volumes 141 from the tracking list 1200 (Step S301).

The tracking module 111 refers to the table 900 based on the data duration period, and obtains history of migration operation of the selected one of the volumes 141 (Step S302). Specifically, the following processing is executed.

(Step S302-1) The tracking module 111 searches for an entry in which the UUID of the selected one of the volumes 141 is stored in the volume UUID 901. In a case where no such entry is found, the processing of Step S302 is skipped.

(Step S302-2) The tracking module 111 determines whether the selected one of the volumes 141 is the first-layer volume 141.

(Step S302-3) In a case where the selected one of the volumes 141 is the first-layer volume 141, the tracking module 111 selects, out of every identified entry, an entry in which a start date/time of migration operation is later than a start date/time of the data duration period, and an end date/time of the migration operation is earlier than an end date/time of the data duration period.

(Step S302-4) In a case where the selected one of the volumes 141 is not the first-layer volume 141, the tracking module 111 tracks copying relationship of the selected one of the volumes 141 by referring to the tracking list 1200 and identifying relevant entries. In a case where the operation type is "routine copying" in every identified entry, the tracking module 111 selects an entry by the same procedure as in Step S302-3. In a case where the operation type is other than "routine copying" in at least one identified entry, the tracking module 111 selects, out of the identified entries, an entry in which the start date/time of the migration operation is later than the start date/time of the data duration period.

This concludes the description of the processing of Step S302.

The tracking module 111 obtains history about external coupling of the selected one of the volumes 141 (Step S303). Specifically, the following processing is executed.

(Step S303-1) The tracking module 111 searches for an entry in which the UUID of the selected one of the volume 141 is stored in the volume UUID 601. In a case where no such entry is found, the processing of Step S303 is skipped.

(Step S303-2) The tracking module 111 obtains history of migration operation of one of the volumes 141 that corresponds to the external volume UUID 602 of the entry found through the search. The history of migration operation is obtained by the same method as in Step S302.

The tracking module 111 identifies each drive group related to the selected one of the volumes 141, and registers the identified drive group in a drive group list 1600 (Step S304).

In the drive group list 1600, entries each including a volume UUID 1601 and a list 1602 are searched. There is one entry for one of the volumes 141. Fields included in each entry are not limited to the fields described above. Each entry may not include one of the fields described above, or may include other fields.

The volume UUID 1601 is the same field as the volume UUID 401. The list 1602 is a field in which identification information of each drive group related to the one of the volumes 141 is stored. Identification information of one or more drive groups is stored in the list 1602.

A drive group in which the selected one of the volumes 141 is located is identifiable based on the table 500. A drive group that is a migration destination of the selected one of the volumes 141 is identifiable based on the drive group ID (Destination) 903 of the history of migration operation. A drive group in which one of the volumes 141 that is a volume for external coupling of the selected one of the volumes 141 is located is identifiable based on the table 500 and the history of migration operation (the table 900).

The tracking module 111 adds an entry to the drive group list 1600, and sets the volume UUID of the selected one of the volumes 141 in the volume UUID 1601 thereof. The tracking module 111 also stores identification information of each identified drive group in the list 1602.

The tracking module 111 determines whether all volumes 141 of the tracking list 1200 have been processed (Step S305).

In a case where it is determined that not all volumes 141 of the tracking list 1200 have been processed, the tracking module 111 returns the process to Step S301 to execute the same processing. In a case where it is determined that all volumes 141 of the tracking list 1200 have been processed, the tracking module 111 ends the drive tracking processing.

Figure 17:
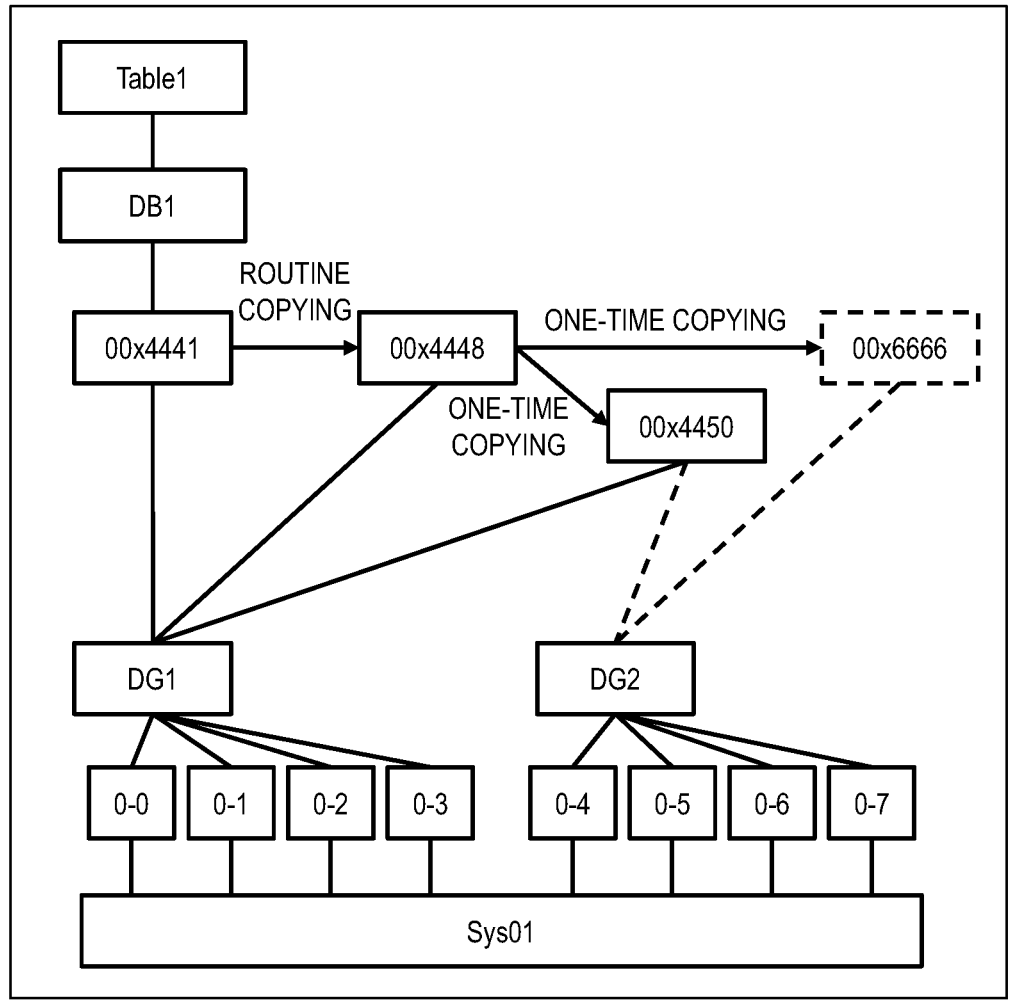
FIG. 17 is a diagram for illustrating an example of a tracking result output by the data lineage management system of the third embodiment.

FIG. 17 is a diagram for illustrating an example of a tracking result output by the data lineage management system 100 of the third embodiment.

The data lineage management system 100 displays a tracking result as the one illustrated in FIG. 17, based on the tracking list 1200, the drive group list 1600, the database management system information 120, and the infrastructure system information 121. A dotted-line box represents a deleted object. A dotted-line link indicates a dissolved association relationship with one of the volumes 141.

The data lineage management system 100 may be designed so as to display only drive groups.

The data lineage management system 100 may be designed so as to display the infrastructure system 102 that includes drive groups as illustrated in FIG. 17.

According to the third embodiment, the data lineage management system 100 is further capable of tracking drive groups that actually store data.

One of the volumes 141 that has been used as a cache in copying, migration, or other types of operation can be tracked as well by using history about the one of the volumes 141. Operation history of applications used on a user side may be obtained in addition to the operation history of the database management system 101 and of the infrastructure system 102. This enables the system to deal with copying by the applications as well.

Although a system that tracks data lineage is described in the embodiments, this invention is also applicable to a system that tracks lineage of a container.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, Python and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer system, comprising at least one computer including a processor, a storage device coupled to the processor, and a network interface coupled to the processor,
the computer system being coupled to at least one database management system for managing data, and at least one infrastructure system for managing storage areas of the data,
the computer system being configured to:
receive a tracking request including identification information of target data;
calculate, based on information on the data managed by the at least one database management system, a data duration period for which the target data is kept managed by the at least one database management system;
identify, based on configuration history information on a configuration of the storage areas in the at least one infrastructure system, a first storage area which is provided to the at least one database management system for the data duration period and which stores the target data;
register the first storage area in a tracking list;
execute, based on the data duration period and history of copying operation of the storage areas of the at least one infrastructure system, with the first storage area as an originating point, tracking processing for tracking a second storage area in which the target data is stored by the copying operation, and wherein, in the tracking processing, the computer system is configured to
select one target storage area from the tracking list,
calculate a duration period of the one target storage area,
calculate a copying operation execution period based on history of copying operation related to the one target storage area of the at least one infrastructure system, and
identify the second storage area based on the data duration period, the duration period of the one target storage area, and the copying operation execution period, and register the identified second storage area in the tracking list; and
output information on the first storage area and the second storage area as the storage areas in which the target data is stored.

2. The computer system according to claim 1, wherein the computer system is configured to:
hold tracking policy information for managing a policy in identifying the second storage area;
identify, based on the history of the copying operation related to the one target storage area of the at least one infrastructure system, one of the storage areas that is a copy of the one target storage area; and
determine whether the identified one of the storage areas satisfies the policy.

3. The computer system according to claim 2,
wherein the policy is set to the tracking policy information for each type of the copying operation, and
wherein the policy is defined by using at least two periods out of the data duration period, the duration period of the one target storage area, and the copying operation execution period.

4. The computer system according to claim 1, wherein the data duration period of the target data is calculated based on a date and a time at which the target data is generated by the at least one database management system and a date and a time at which the target data is completely deleted by the at least one database management system.

5. The computer system according to claim 1, wherein the computer system is configured to:
identify, based on the configuration history information on the configuration of the storage areas in the at least one infrastructure system, a drive group that provides storage areas to the first storage area and the second storage area; and
output information on the identified drive group.

6. The computer system according to claim 5, wherein the computer system is configured to:
identify, based on the configuration history information on the configuration of the storage areas in the at least one infrastructure system, one infrastructure system in which the identified drive group is installed out of the at least one infrastructure system; and
output information about the identified one infrastructure system.

7. The computer system according to claim 1, wherein the computer system is configured to execute at least one of deletion operation of the target data or copying operation of the target data in the first storage area and the second storage area in accordance with an instruction from a user.

8. The computer system according to claim 1, wherein the computer system is configured to:
hold storage policy information for managing a policy about a storage location of the data; and
determine whether the first storage area and the second storage area satisfy the policy about the storage location of the data, and output a result of the determination.

9. A method of tracking lineage of data, the method including:
receiving a tracking request including identification information of target data;
calculating, based on information on data managed by at least one database management system, a data duration period for which the target data is kept managed by the at least one database management system;
identifying, based on configuration history information on a configuration of storage areas in at least one infrastructure system, a first storage area which is provided to the at least one database management system for the data duration period and which stores the target data;
registering the first storage area in a tracking list;
executing, based on the data duration period and history of copying operation of the storage areas of the at least one infrastructure system, with the first storage area as an originating point, tracking processing for tracking a second storage area in which the target data is stored by the copying operation, and wherein the tracking processing includes
selecting one target storage area from the tracking list,
calculating a duration period of the one target storage area,
calculating a copying operation execution period based on history of copying operation related to the one target storage area of the at least one infrastructure system,
identifying the second storage area based on the data duration period, the duration period of the one target storage area, and the copying operation execution period, and registering the identified second storage area in the tracking list; and
outputting information on the first storage area and the second storage area as the storage areas in which the target data is stored.

10. The method of tracking lineage of data according to claim 9, the method further including:
- holding tracking policy information for managing a policy in identifying the second storage area;
- identifying, based on the history of the copying operation related to the one target storage area of the at least one infrastructure system, one of the storage areas that is a copy of the one target storage area; and
- determining whether the identified one of the storage areas satisfies the policy.

11. The method of tracking lineage of data according to claim 10,
- wherein the policy is set to the tracking policy information for each type of the copying operation, and
- wherein the policy is defined by using at least two periods out of the data duration period, the duration period of the one target storage area, and the copying operation execution period.

12. A non-transitory computer-readable medium having stored thereon a program to be executed by a computer, the program causing the computer to execute:
- receiving a tracking request including identification information of target data;
- calculating, based on information on data managed by at least one database management system, a data duration period for which the target data is kept managed by the at least one database management system;
- identifying, based on configuration history information on a configuration of storage areas in at least one infrastructure system, a first storage area which is provided to the at least one database management system for the data duration period and which stores the target data;
- registering the first storage area in a tracking list;
- executing, based on the data duration period and history of copying operation of the storage areas of the at least one infrastructure system, with the first storage area as an originating point, tracking processing for tracking a second storage area in which the target data is stored by the copying operation, and wherein the tracking processing includes
  - selecting one target storage area from the tracking list,
  - calculating a duration period of the one target storage area,
  - calculating a copying operation execution period based on history of copying operation related to the one target storage area of the at least one infrastructure system,
  - identifying the second storage area based on the data duration period, the duration period of the one target storage area, and the copying operation execution period, and registering the identified second storage area in the tracking list; and
- outputting information on the first storage area and the second storage area as the storage areas in which the target data is stored.

* * * * *